United States Patent
Tang

(10) Patent No.: US 7,577,423 B2
(45) Date of Patent: Aug. 18, 2009

(54) SYSTEM AND METHOD FOR IDENTIFYING ACCESS POINT

(75) Inventor: Cheng-Wen Tang, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 280 days.

(21) Appl. No.: 11/309,586

(22) Filed: Aug. 26, 2006

(65) Prior Publication Data

US 2007/0254615 A1    Nov. 1, 2007

(30) Foreign Application Priority Data

Apr. 28, 2006    (TW) ............... 095115302

(51) Int. Cl.
*H04M 1/66* (2006.01)
*H04W 4/00* (2009.01)

(52) U.S. Cl. ............... 455/410; 455/411; 455/422.1

(58) Field of Classification Search ............... 455/410, 455/411, 422.1, 432.1, 456.3, 452.1, 67.11; 726/23, 27; 370/351, 310, 310.2, 338
See application file for complete search history.

(56) References Cited

U.S. PATENT DOCUMENTS

| | | | |
|---|---|---|---|
| 7,002,943 B2 * | 2/2006 | Bhagwat et al. ............. 370/338 |
| 7,039,027 B2 * | 5/2006 | Bridgelall .................... 370/329 |
| 7,058,796 B2 * | 6/2006 | Lynn et al. ..................... 713/1 |
| 7,206,840 B2 * | 4/2007 | Choi et al. .................. 709/225 |
| 7,224,679 B2 * | 5/2007 | Solomon et al. ............ 370/338 |
| 7,277,404 B2 * | 10/2007 | Tanzella et al. ............. 370/310 |
| 7,317,914 B2 * | 1/2008 | Adya et al. ................. 455/421 |
| 2004/0102192 A1 * | 5/2004 | Serceki ........................ 455/434 |
| 2004/0236851 A1 | 11/2004 | Kuan et al. |
| 2006/0150250 A1 * | 7/2006 | Lee et al. ....................... 726/23 |
| 2007/0019591 A1 * | 1/2007 | Chou et al. .................. 370/337 |
| 2007/0094741 A1 * | 4/2007 | Lynn et al. .................... 726/26 |
| 2007/0123194 A1 * | 5/2007 | Karaoguz et al. ........... 455/403 |
| 2007/0256135 A1 * | 11/2007 | Doradla et al. ................ 726/26 |

* cited by examiner

*Primary Examiner*—Sonny Trinh
(74) *Attorney, Agent, or Firm*—Wei Te Chung

(57) ABSTRACT

A system for identifying an access point is provided, the system arranged in a mobile station associated with the access point. The system includes a detecting module, a controlling module, a determining module, and an identifying module. The detecting module detects a beacon from the access point. The controlling module controls a connection status between the mobile station and the access point. The determining module determines whether the number of the mobile stations associated with the access point varies with changes in the connection status. The identifying module identifies a status of the access point based on a determination result. A method for identifying an access point is also provided.

10 Claims, 4 Drawing Sheets

SYSTEM AND METHOD FOR IDENTIFYING ACCESS POINT

FIELD OF THE INVENTION

The invention relates to a system and method for identifying an access point, and more particularly to a system and method for identifying an access point in a wireless local area network (WLAN).

DESCRIPTION OF RELATED ART

Among WLAN standards launched by the Institute of Electrical and Electronics Engineers (IEEE), 802.11e is an up-to-date version that is especially dedicated to broadband applications, such as voice over Internet Protocol (VoIP) and streaming media.

Typically, in a network environment complying with the IEEE 802.11e standard, a hacker may generate a fake beacon including an information element of a quality-of-service basic service set (QBSS) load, and broadcast the fake beacon to adjacent mobile stations and access points. The fake beacon may affect users ability to perform a load balance in a WLAN network according to the QBSS load, and degrade overall performance of the WLAN network.

Therefore, a heretofore unaddressed need exists in the industry to overcome the aforementioned deficiencies and inadequacies.

SUMMARY OF THE INVENTION

A system for identifying an access point is arranged in a mobile station associated with the access point. The system includes a detecting module, a controlling module, a determining module, and an identifying module. The detecting module is for detecting a beacon from the access point. The controlling module is for controlling a connection status between the mobile station and the access point. The determining module is for determining whether the number of the mobile stations associated with the access point varies with changes in the connection status. The identifying module is for identifying a status of the access point based on a determination result.

A method for identifying an access point is also provided, the method applicable to a mobile station associated with an access point. The method includes detecting a beacon from the access point; associating the mobile station with the access point after detecting the beacon; determining whether the number of the mobile stations associated with the access point varies when the mobile station is associated with the access point; disassociating the mobile station from the access point if the number of the mobile stations associated with the access point varies, determining whether the number of the mobile stations associated with the access point varies again when the mobile station is disassociated with the access point, and identifying the access point as authentic if the number of the mobile stations associated with the access point varies again.

Other advantages and novel features will become more apparent from the following detailed description when taken in conjunction with the accompanying drawings, in which:

DETAILED DESCRIPTION OF THE INVENTION

Figure 1:
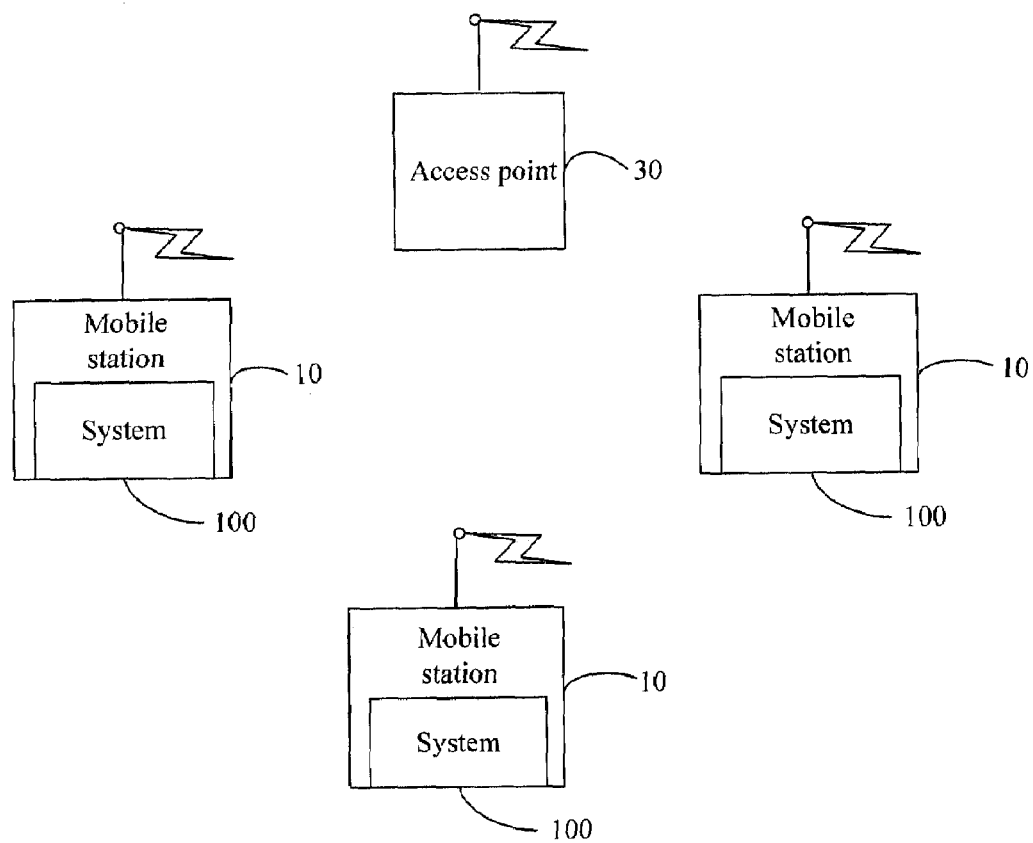
FIG. 1 is a schematic diagram illustrating an application environment of a system for identifying an access point of an exemplary embodiment of the invention.

FIG. 1 is a schematic diagram illustrating an application environment of a system 100 for identifying an access point of an exemplary embodiment of the invention. The system 100 is arranged in a mobile station 10, which is connected to an access point 30 via a wireless network. In this embodiment, the mobile station 10 is a laptop computer or a personal digital assistant (PDA), and the wireless network is a wireless local area network (WLAN) complying with an IEEE 802.11e standard.

Figure 2:
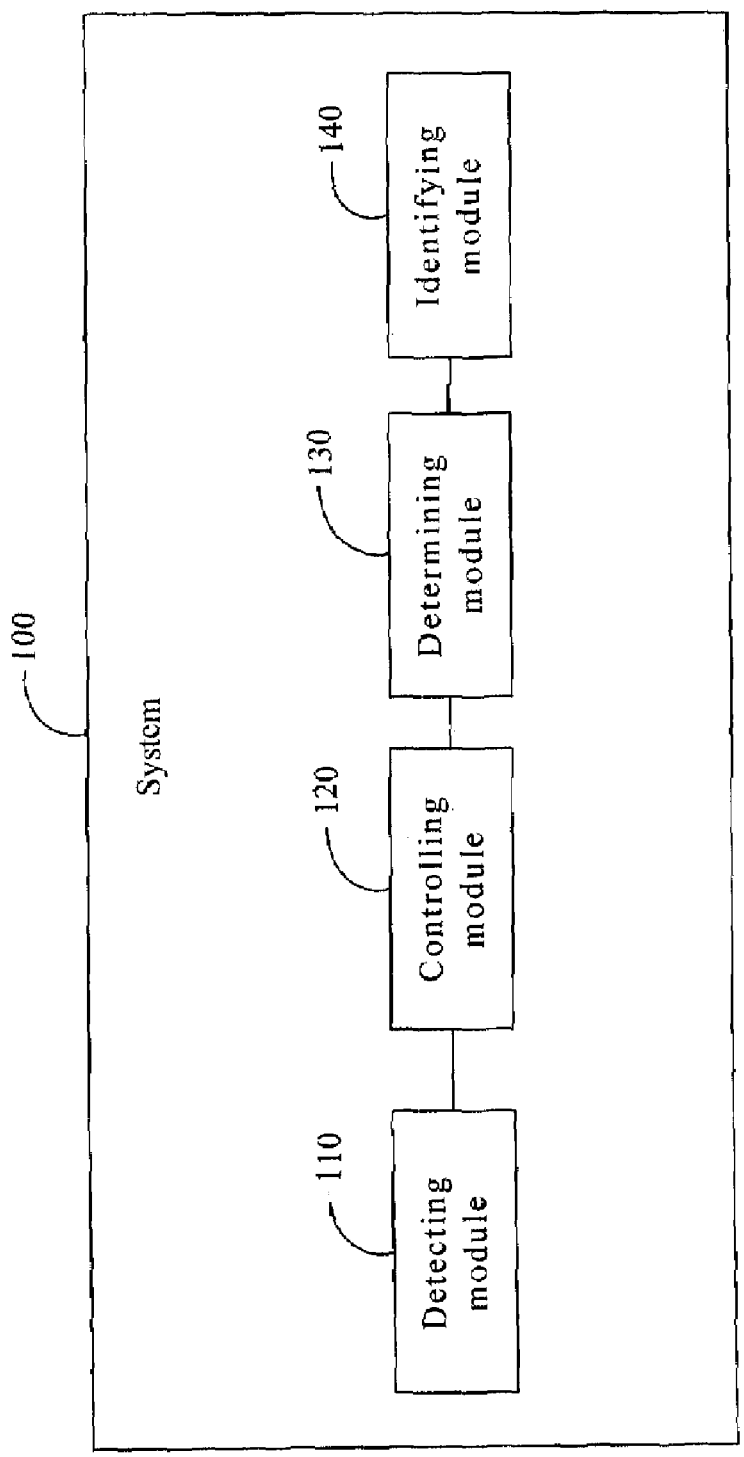
FIG. 2 is a block diagram of the system of the exemplary embodiment of the invention.

FIG. 2 is a block diagram of the system 100 of the exemplary embodiment of the invention. The system 100 includes a detecting module 110, a controlling module 120, a determining module 130, and an identifying module 140.

The detecting module 110 detects a beacon frame 200 from the access point.

The controlling module 120 controls a connection status between the mobile station 10 and the access point 30. In this embodiment, the connection status includes an association status and a disassociation status. The controlling module 120 associates the mobile station 10 with the access point 30 by sending an association request, and disassociates the mobile station 10 from the access point 30 by sending a disassociation request.

The determining module 130 determines whether the number of the mobile stations 10 associated with the access point 30 varies with the connection status between the mobile station 10 and the access point 30. In this embodiment, the determining module 130 determines whether the number varies by inquiring a station count field in the beacon frame 200. If one access point 30 is an authentic access point, then when the access point 30 is associated with the mobile station 10, a value indicated by the station count field increases by one after association, and decreases by one after disassociation.

The identifying module 140 identifies a status of the access point 30 based on a determination result from the determining module 130. In this embodiment, the status of the access point 30 includes an authentic status and a fake status.

Figure 3:
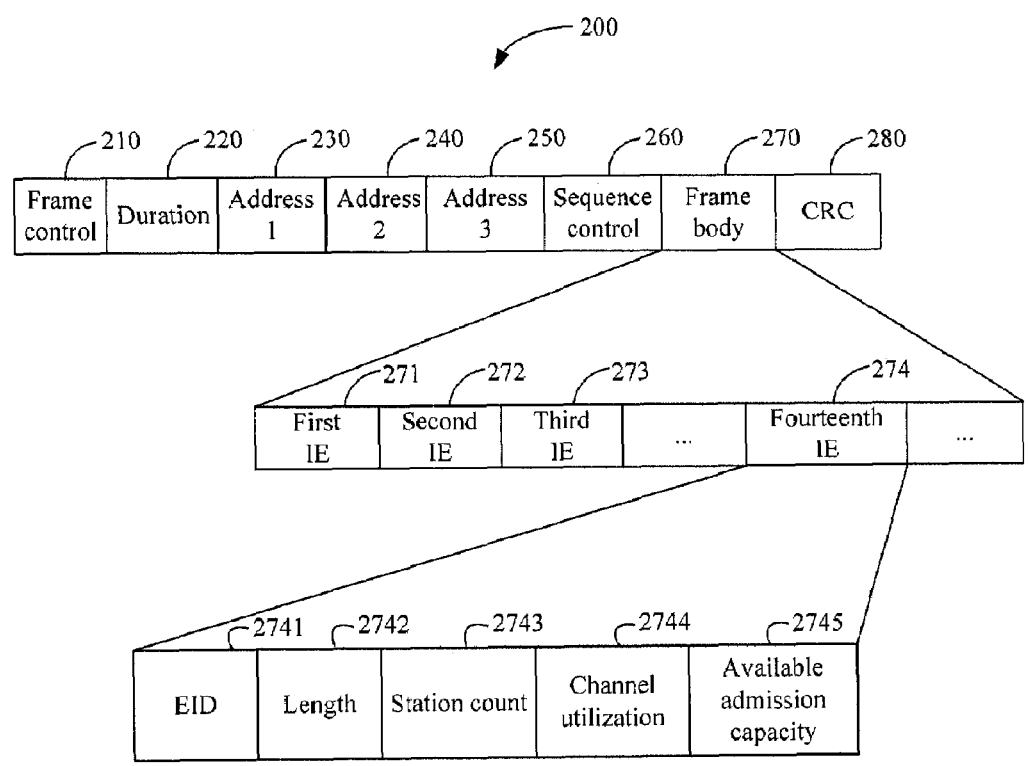
FIG. 3 illustrates a format of a beacon frame.

FIG. 3 illustrates a format of the beacon frame 200. The beacon frame 200 includes a frame control field 210, a duration/ID field 220, an address 1 field 230, an address 2 field 240, an address 3 field 250, a sequence control field 260, a frame body field 270, and a cyclic redundancy check (CRC) field 280. The frame body field 270 includes a plurality of information elements (IE) consecutively labeled as a first IE 271, a second IE 272, a third IE 273, . . . , a fourteenth IE 274, and so on. The fourteenth IE 274 indicates a quality-of-service basic service set (QBSS) load, having an element identification (EID) subfield 2741, a length subfield 2742, a station count 2743, a channel utilization subfield 2744, and an available admission capacity subfield 2745.

The EID subfield 2741 indicates a sequence number of the IE in which the EID subfield 2741 exists. In this embodiment, since the EID subfield 2741 is in the fourteenth IE 274, the EID subfield 2741 is set to 14.

The length subfield 2742 indicates a length of the fourteenth IE 274. In this embodiment, the length is represented in units of bytes.

The station count subfield 2743 indicates the number of the mobile stations 10 currently associated with the access point 30.

The channel utilization subfield 2744 indicates a percentage of time a medium is sensed busy.

The available admission capacity subfield 2745 indicates the amount of time that can be used by explicit admission control.

Figure 4:
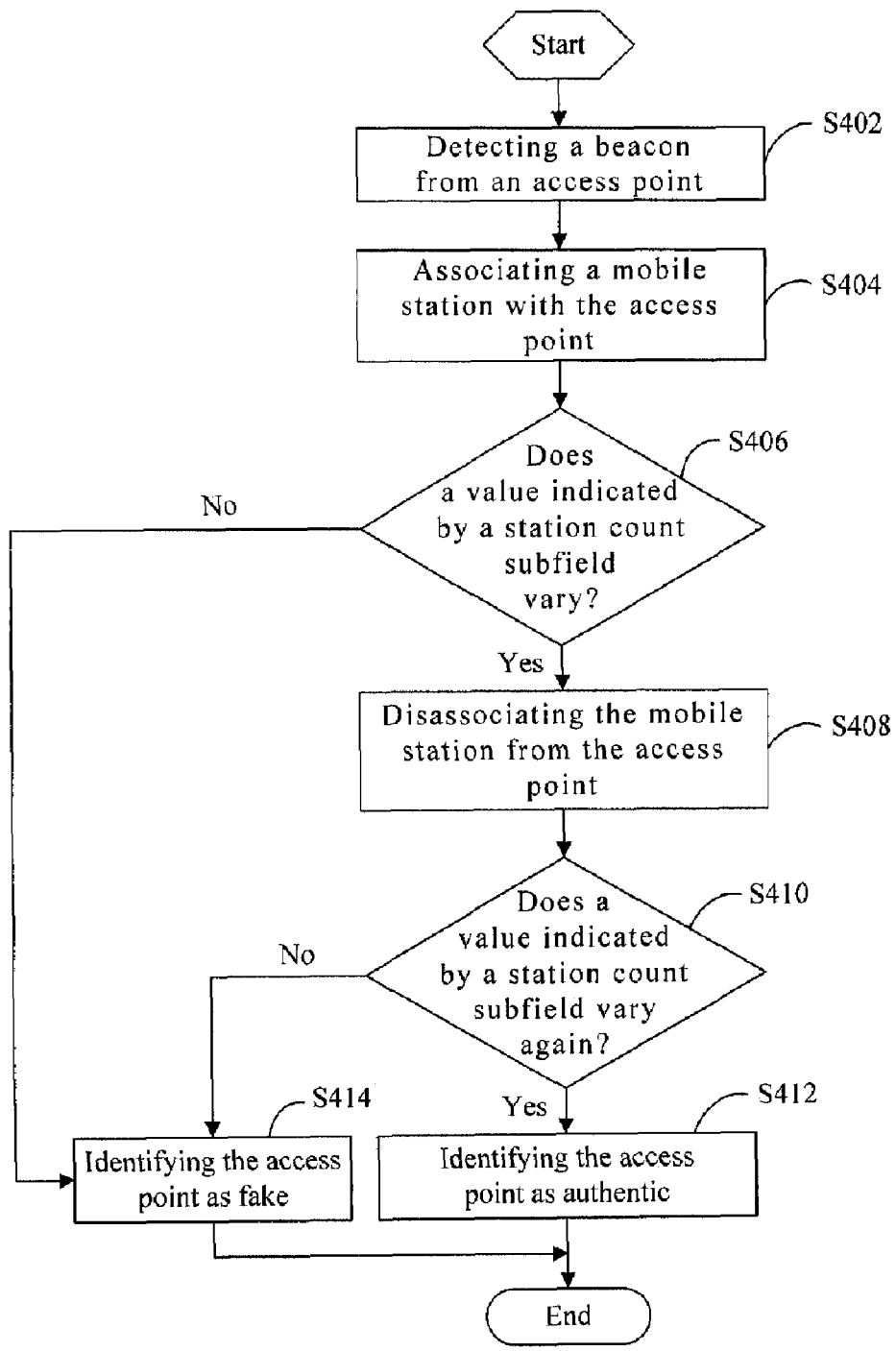
FIG. 4 is a flowchart of a method for identifying an access point of another exemplary embodiment of the invention.

FIG. 4 is a flowchart of a method for identifying an access point of an exemplary embodiment of the invention.

In step S402, the detecting module 110 detects the beacon frame from the access point 30.

In step S404, the controlling module 120 associates the mobile station 10 with the access point 30.

In step S406, the determining module 130 determines whether the value indicated by the station count subfield 2743 varies. If the value varies, the process proceeds to step S408. If the value does not vary, the process proceeds to step S414.

In step S408, the controlling module 120 disassociates the mobile station 10 from the access point 30.

In step S410, the determining module 130 determines whether the value indicated by the station count subfield 2743 varies again. If the value varies again, the process proceeds to step S412. If the value does not vary, the process proceeds to step S414.

In step S412, the identifying module 140 identifies the access point 30 as authentic.

In step S414, the identifying module 140 identifies the access point 30 as fake.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A system for identifying an access point, the system arranged in a mobile station associated with the access point via a wireless network, the system comprising:
    a detecting module for detecting a beacon from the access point;
    a controlling module for controlling a connection status between the mobile station and the access point, wherein the connection status comprises an association status and a disassociation status;
    a determining module for determining whether the number of the mobile stations associated with the access point varies with changes of the connection status between the association status and the disassociation status; and
    an identifying module for identifying a status of the access point based on the determination result;
    wherein the identifying module identifies the access point as authentic when the number of the mobile stations associated with the access point varies with changes of the connection status between the association status and the disassociation status, or identifies the access point as fake when the number of the mobile stations associated with the access point does not vary with changes of the connection status between the association status and the disassociation status.

2. The system as recited in claim 1, wherein the number of the mobile stations associated with the access point is indicated by a station count subfield in an information element of a quality-of-service basic service set (QBSS) load.

3. The system as recited in claim 1, wherein the wireless network is a wireless local area network complying with an IEEE 802.11e standard.

4. The system as recited in claim 1, wherein the mobile station is a laptop computer.

5. A method for identifying an access point utilized in a mobile station associated with the access point, the method comprising:
    detecting a beacon from the access point;
    associating the mobile station with the access point after detecting the beacon;
    determining whether the number of mobile stations associated with the access point varies when the mobile station is associated with the access point;
    disassociating the mobile station from the access point if the number of mobile stations associated with the access point varies;
    determining whether the number of mobile stations associated with the access point varies again when the mobile station is disassociated with the access point; and
    identifying the access point as authentic if the number of mobile stations associated with the access point varies again.

6. The method as recited in claim 5, wherein the number of mobile stations associated with the access point is indicated by a station count subfield in an information element of a quality-of-service basic service set (QBSS) load.

7. The method as recited in claim 5, further comprising a step of identifying the access point as fake if the number of mobile stations associated with the access point does not vary when the mobile station is associated with the access point.

8. The method as recited in claim 7, further comprising a step of identifying the access point as fake if the number of mobile stations associated with the access point does not vary again when the mobile station is disassociated with the access point.

9. A method for identifying an access point, comprising the steps of:
    associating a mobile station with an access point by detecting available beacons from said access paint;
    verifying variation of a number for counting associated and disassociated times of said access point from said available beacons; and
    identifying said access point as fake when said number fails to vary.

10. The method as recited in claim 9, further comprising the step of verifying said variation of said number when said mobile station is disassociated from said access point in order to identify said access point.

\* \* \* \* \*